United States Patent [19]
de Groot

[11] Patent Number: 6,163,379
[45] Date of Patent: Dec. 19, 2000

[54] INTERFEROMETER WITH TILTED WAVEPLATES FOR REDUCING GHOST REFLECTIONS

[75] Inventor: Peter J. de Groot, Middletown, Conn.

[73] Assignee: Zygo Corporation, Middlefield, Conn.

[21] Appl. No.: 09/384,609

[22] Filed: Aug. 27, 1999

[51] Int. Cl.[7] .................................................. G01B 9/02
[52] U.S. Cl. ............................................................ 356/493
[58] Field of Search ..................................... 356/351, 349

[56] References Cited

U.S. PATENT DOCUMENTS

| | | | |
|---|---|---|---|
| 3,450,476 | 6/1969 | Rando ...................................... | 356/107 |
| 4,189,233 | 2/1980 | Hurt et al. .................................. | 356/5 |
| 4,784,490 | 11/1988 | Wayne ...................................... | 356/351 |
| 4,865,450 | 9/1989 | Munechika et al. ...................... | 356/349 |
| 5,398,112 | 3/1995 | Ai et al. .................................... | 356/359 |

OTHER PUBLICATIONS

Wu, Chien–Ming and Deslattes, Richard D., "Analytical modeling of the periodic nonlinearity in heterodyne interferometry", Applied Optics, vol. 37, No. 28, Oct. 1, 1998.

*Primary Examiner*—Robert Kim
*Assistant Examiner*—Phil Natividad
*Attorney, Agent, or Firm*—Francis J. Caulfield

[57] ABSTRACT

Polarization interferometric architectures, preferably plane mirror types, having first and second measurement legs are provided with retardation elements, preferably, at least one set of split waveplates, comprised of two segments, tilted slightly (e.g., 2 mrad) in opposite directions with respect to each other to reduce the effects of undesirable ghost beams that otherwise would travel along the same path as the principal beams to produce significant cyclic errors. With the use of the split waveplates, double reflection ghost beams have net tilts relative to the principal measurement beam, and therefore do not contribute to interference effects. This effectively eliminates waveplate ghost reflections as a source of error. Use of the such split, tilted waveplates may be made in a variety of polarization interferometers including, but not limited to, uncompensated plane mirror, high stability plane mirror, differential plane mirror, double differential plane mirror, and dual linear/angular types.

15 Claims, 3 Drawing Sheets

INTERFEROMETER WITH TILTED WAVEPLATES FOR REDUCING GHOST REFLECTIONS

CROSS-REFERENCE TO RELATED APPLICATION

This application is related to commonly owned co-pending U.S. patent application Ser. No. 09/384,855 filed on even date herewith.

BACKGROUND OF THE INVENTION

This invention in general relates to displacement measurement interferometry and more particularly to apparatus by which the undesirable effects of ghost images on measurement signals can be substantially reduced.

Ghost images can be formed in displacement measurement interferometers through reflections from internal components in such a way that ghost beams overlap signal beams to cause significant errors. To be more concrete about the nature of ghost beams, reference is now made to FIG. 1 which shows an example of a high-stability plane mirror interferometer (HSPMI) that is a common type of displacement interferometer for stage metrology (For further examples see, e.g., Dr. C. Zanoni, *Differential Interferometer Arrangements for Distance and Angle Measurements: Principles, Advantages and Applications*, VDI BERICHTE NR. 749, 1989). It is evident from FIG. 1 that there are many opportunities for generating accidental reflections, resulting in "ghost" beams. Some of these reflections mix coherently in the interferometer to introduce nonlinearities. In particular, the front and back surfaces of measurement waveplate, $W_R$ shown in FIG. 1 generate ghost beams that can perfectly overlap the desired measurement beam. Unlike many of the reflections from the glass components, the polarization properties of the waveplate prevent separation of ghost beams by their polarization state. The resulting nonlinearity is potentially more serious than the commonly known error sources such as polarization mixing.

Most single-surface reflections may be defeated by tilting the various components of the interferometer with respect to each other and with respect to the stage mirror. These tilts diminish the effect of ghost beams by introducing tilt between them and the main beam. In other words, there are too many tilt fringes in these beams to generate strong interference signals. However, because there are 20 surface reflections for both the measurement and reference beams as shown in FIG. 1, there are 400 possible ghost beam paths involving two accidental reflections. As is the case with single-surface reflections, deliberately tilting the components removes many of the most troublesome two-surface reflections, provided that the two surfaces are not angled such as to cancel out the tilts. Unfortunately, many of the two-surface reflections involve the same optical component with a retroreflection in between. The two reflection angles cancel, resulting in a ghost beam that adds coherently to the main beams.

FIGS. 2 and 3 show two examples of ghost beam paths involving two surface reflections from the measurement waveplate. While the paths of these ghost beams are shown separated, it will be appreciated that, in reality, they overlap the principal interferometer beams. Because of the retroreflector, attempts to avoid these paths by tilting the waveplate fail, for the same reason that the interferometer accommodates tips and tilts in the stage mirror. No matter how the wave plate is tilted, ghost beams will find their way to the detector.

To be quatitative, the peak-valley (PV) error δx in a plane-mirror interferometer resulting from a ghost beam of relative electric field amplitude ε is given by:

$$\delta x = \frac{\varepsilon \lambda}{4\pi} \quad (1)$$

A quartz waveplate with a reflectivity of 0.5% nets a value ε of 0.005 after two reflections, and consequently δx=0.25 nm for each of the contributions shown in FIGS. 2 and 3. In comparison, the contribution from HSPMI polarization mixing in a high-quality beam splitter (<0.1% extinction) is an order of magnitude smaller (0.05 nm).

While there has been considerable attention on frequency and polarization mixing as error sources in these interferometers, there has been a noticeable absence of any treatment of problems attributed to ghost reflections. For example, in Appl. Opt. 37(28), 6696–6700 (1998), Wu and Deslattes briefly discuss the causes and effects of ghosts and note that some materials, such as mica and calcite, are poor substrates for AR coatings. However, they do not describe any means for reducing these ghosts.

Consequently, it is a primary object of the present invention to provide apparatus by which the effects of undesirable ghost beams generated in a displacement interferometer may be reduced.

Another principal object of the invention is to eliminate the possibility of coherent second-order ghost reflections from the measurement waveplate of a high stability plane mirror interferometer (HSPMI) as well as other plane-mirror interferometer types of architectures.

Other objects of the invention will in part be obvious and in part appear hereinafter when the following detailed description is read in connection with the drawings.

SUMMARY OF THE INVENTION

This invention in general relates to displacement interferometry and in particular to polarization interferometric architectures, preferably plane mirror types, having first and second measurement legs, one preferably fixed and serving as a reference leg, and one preferably moveable to measure displacement, either linear, angular, or both. Polarization retardation elements, preferably in the form of a set of split waveplates, comprised of two segments, tilted slightly (e.g., 2 mrad) in opposite directions with respect to each other, preferably reside in the measurement leg to reduce the effects of undesirable ghost beams that otherwise would travel along the same path as the principal beams to produce significant cyclic errors. A second set of such split waveplates may be used beneficially in the reference leg. With the use of the split waveplates, double reflection ghost beams have net tilts relative to the principal measurement beam, and therefore do not contribute to interference effects. This effectively eliminates waveplate ghost reflections as a source of error. Use of the inventive split, tilted waveplates may be made in a variety of polarization interferometers including, but not limited to, uncompensated plane mirror, high stability plane mirror, differential plane mirror, double differential plane mirror, and dual linear/angular types.

BRIEF DESCRIPTION OF THE DRAWINGS

The structure, operation, and methodology of the invention, together with other objects and advantages thereof, may best be understood by reading the detailed description in connection with the drawings in which each part has an assigned numeral that identifies it wherever it appears in the various drawings and wherein.

DETAILED DESCRIPTION OF THE INVENTION

Figure 1:
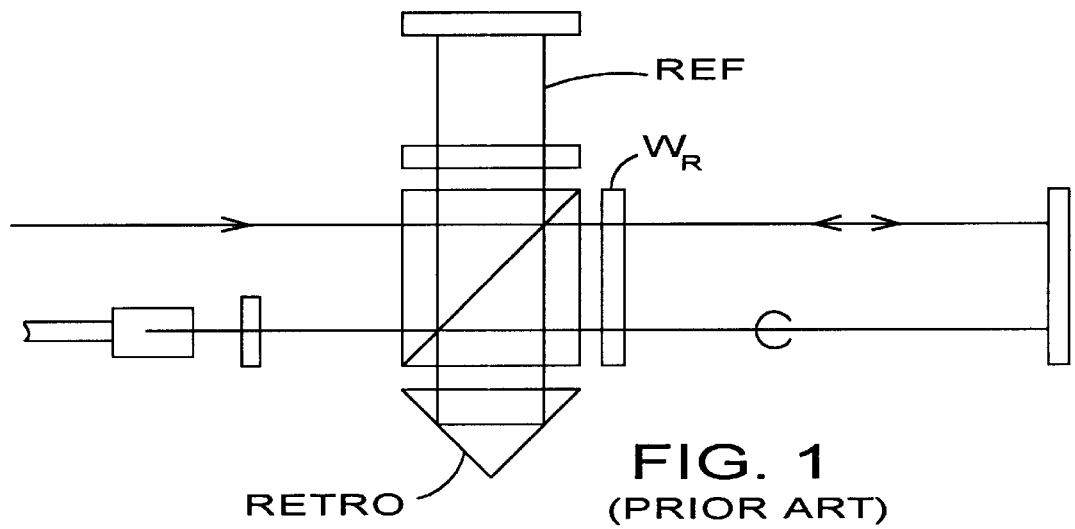
FIG. 1 is a diagrammatic plan view of a well-known prior art highstability plane mirror interferometer.
Figure 2:
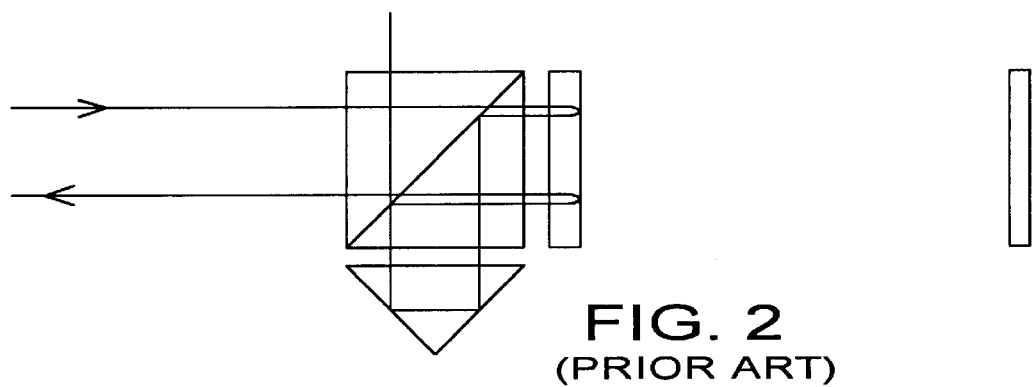
FIG. 2 is a diagrammatic plan view of selected elements of the interferometer of FIG. 1 showing one source of undesirable ghost reflections caused by two polarization-rotating surface reflections from a quarter wave plate located in the measurement leg of the interferometer.
Figure 3:
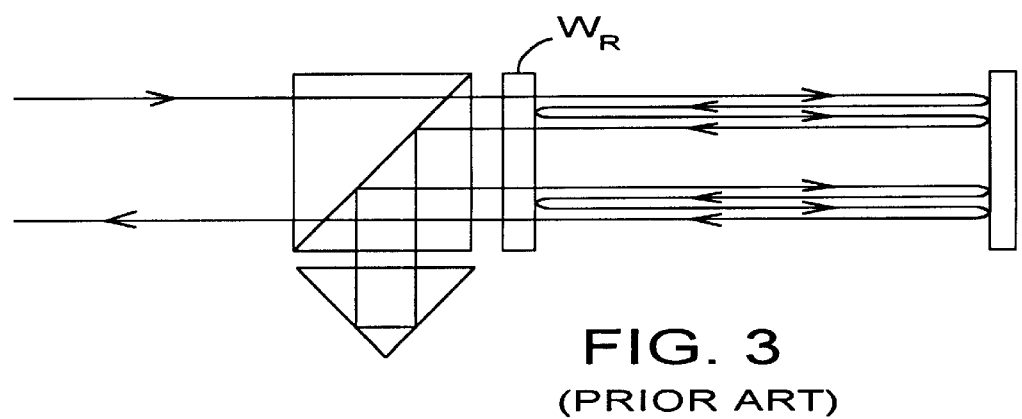
FIG. 3 is a diagrammatic plan view of similar to FIG. 2 showing another source for undesirable ghost reflections that occur as a ghost beam undergoes four passes through the interferometer caused by two simple polarization preserving surface reflections from a quarter wave plate.
Figure 4:
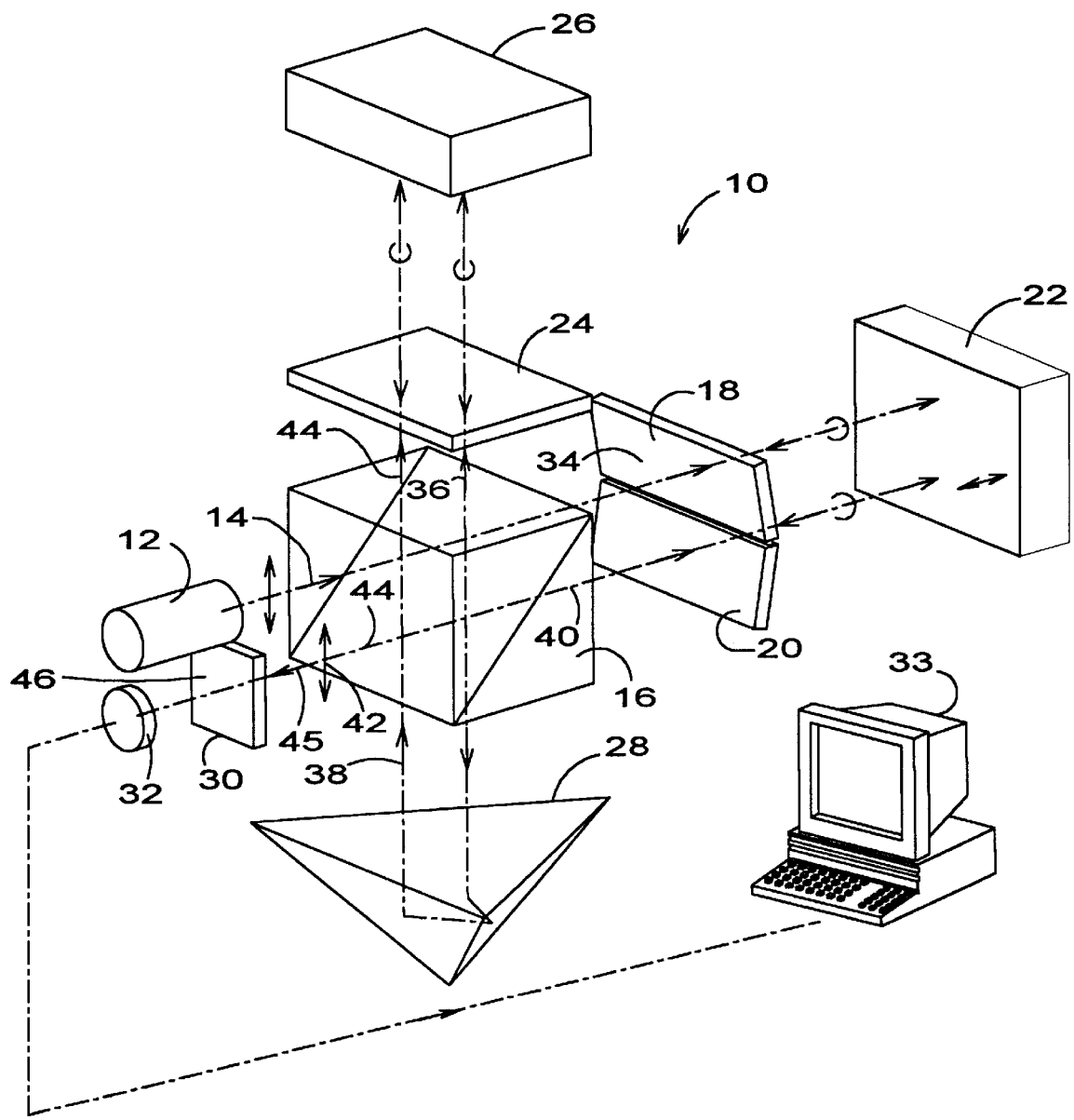
FIG. 4 is a diagrammatic perspective view of a high stability plane mirror interferometer that employs two oppositely tilted quarter wave plates in the measurement leg of the interferometer to reduce the effects of undesirable ghost reflections on the output signals.

Reference is now made to FIG. 4, which is a diagrammatic perspective view of a high stability plane mirror interferometer 10 that preferably employs two oppositely tilted quarter wave plates in its measurement leg to reduce the effects of undesirable ghost reflections on the output signals. As seen in FIG. 1, interferometer 10 comprises a source 12 for generating an input beam 14 preferably comprising two orthogonally polarized coextensive components indicated symbolically by the dot (s-polarization) and adjacent vertical double headed arrow (p-polarization). Source 12 is preferably a laser or like source of coherent radiation, preferably polarized, and having a wavelength $\lambda_1$. For purposes of heterodyne detection, a modulator may be provided in the form, for example, of an acousto-optical device or a combination of acousto-optical devices with additional optics for selectively modulating polarization components of beam 14. Such a modulator preferably shifts the oscillation frequency of one linearly polarized component of beam 14 an amount $f_1$ with respect to an orthogonally linearly polarized component, the directions of polarization of the components being denoted as shown. It will also be appreciated that beam 14 may have two or more wavelengths for practicing, for example, dispersion interferometry and that these wavelengths may be harmonically related.

It will be appreciated by those skilled in the art that beams 14 may be provided alternatively by a single laser source emitting more than one wavelength, by a single laser source combined with optical frequency doubling means to achieve frequency doubling, tripling, quadrupling, etc., two laser sources of differing wavelengths combined with sum-frequency generation or difference-frequency generation, or any equivalent source configuration capable of generating light beams one, two, or more wavelengths.

A laser source, for example, can be a gas laser, e.g. a HeNe, stabilized in any of a variety of conventional techniques known to those skilled in the art, see for example, T. Baer et al., "Frequency Stabilization of a 0.633 µm He—Ne-longitudinal Zeeman Laser," Applied Optics, 19, 3173–3177 (1980); Burgwald et al., U.S. Pat. No. 3,889,207, issued Jun. 10, 1975; and Sandstrom et al., U.S. Pat. No. 3,662,279, issued May 9, 1972. Alternatively, the laser can be a diode laser frequency stabilized by one of a variety of conventional techniques known to those skilled in the art, see, for example, T. Okoshi and K. Kikuchi, "Frequency Stabilization of Semiconductor Lasers for Heterodyne-type Optical Communication Systems," Electronic Letters, 16, 179–181 (1980) and S. Yamaqguchi and M. Suzuki, "Simultaneous Stabilization of the Frequency and Power of an AlGaAs Semiconductor Laser by Use of the Optogalvanic Effect of Krypton," IEEE J. Quantum Electronics, QE-19, 1514–1519 (1983).

It will also be appreciated by those skilled in the art that the two optical frequencies of beam 14 where employed may be produced by any of a variety of frequency modulation apparatus and/or lasers: (1) use of a Zeeman split laser, see for example, Bagley et al., U.S. Pat. No. 3,458,259, issued Jul. 29, 1969; G. Bouwhuis, "Interferometrie Mit Gaslasers," Ned. T. Natuurk, 34, 225–232 (August 1968); Bagley et al., U.S. Pat. No. 3,656,853, issued Apr. 18, 1972; and H. Matsumoto, "Recent interferometric measurements using stabilized lasers," Precision Engineering, 6(2), 87–94 (1984); (2) use of a pair of acousto-optical Bragg cells, see for example, Y. Ohtsuka and K. Itoh, "Two-frequency Laser Interferometer for Small Displacement Measurements in a Low Frequency Range," Applied Optics, 18(2), 219–224 (1979); N. Massie et al., "Measuring Laser Flow Fields With a 64-Channel Heterodyne Interferometer," Applied Optics, 22(14), 2141–2151 (1983); Y. Ohtsuka and M. Tsubokawa, "Dynamic Two-frequency Interferometry for Small Displacement Measurements," Optics and Laser Technology, 16, 25–29 (1984); H. Matsumoto, ibid.; P. Dirksen, et al., U.S. Pat. No. 5,485,272, issued Jan. 16, 1996; N. A. Riza and M. M. K. Howlader, "Acousto-optic system for the generation and control of tunable low-frequency signals," Opt. Eng., 35(4), 920–925 (1996); (3) use of a single acousto-optic Bragg cell, see for example, G. E. Sommargren, commonly owned U.S. Pat. No. 4,684,828, issued Aug. 4, 1987; G. E. Sommargren, commonly owned U.S. Pat. No. 4,687,958, issued Aug. 18, 1987; P. Dirksen, et al., ibid.; (4) use of two longitudinal modes of a randomly polarized HeNe laser, see for example, J. B. Ferguson and R. H. Morris, "Single Mode Collapse in 6328 Å HeNe Lasers," Applied Optics, 17(18), 2924–2929 (1978); or (5) use of birefringent elements or the like internal to the laser, see for example, V. Evtuhov and A. E. Siegman, "A 'Twisted-Mode' Technique for Obtaining Axially Uniform Energy Density in a Laser Cavity," Applied Optics, 4(1), 142–143 (1965).

The specific device used for the sources of beams 14 will determine its diameter and divergence. For some sources, e.g., a diode laser, it will likely be necessary to use conventional beam shaping optics, e.g., a conventional microscope objective, to provide beams 14 with a suitable diameter and divergence for the elements that follow. When the source is a HeNe laser, for example, beam shaping optics may not be required.

The other components of interferometer 10 comprise a polarizing beam splitter 16, retardation means, preferably in the form of a pair of quarter wave plates, 18 and 20, to the right of the exit facet of beam splitter 16, oppositely tilted (e.g., 2 mrad) with respect to one another, a moveable plane mirror 22 to the right of quarter wave plates 18 and 20 adapted for movement in a well-known manner, a quarter wave plate 24 located above beam splitter 16 adjacent its top facet, a fixed reference plane mirror 26, preferably fixed, located above quarter wave plate 24, and a cube corner retroreflector 28 located opposite the bottom facet of beam-splitter 16.

Beam 14 is intercepted by polarizing beam splitter 16 that operates to separate its orthogonally polarized components by transmitting the p-polarization component for travel along the measurement leg of interferometer 10 as beam 34 and reflects the s-polarization component for travel along the reference leg of interferometer 10 as beam 36.

Beam 34 passes through tilted quarter wave plate 18, becomes circularly polarized, reflects off moveable plane mirror 22, having its handedness changed in the process, and travels back to quarter wave plate 18 again after which it emerges as s-polarized light. It then is reflected off the coated hypotenuse surface of beam splitter 16 after which it enters cube corner retroreflector 28, emerging therefrom as beam 38 traveling back toward beam splitter 16. Beam 38 is reflected off beam splitter 16 for travel back toward moveable plane mirror 22 as beam 40. Beam 40 passes through tilted quarter wave plate 20 emerging therefrom as circularly polarized light, reflects off moveable plane mirror 22 having its handedness reversed in the process, and emerges from tilted quarter wave plate 20 as p-polarized light, which is transmitted through beam splitter 16 as an output beam component 42.

Beam 36 emerges from beam splitter 16 traveling upwardly therefrom, passes through quarter wave plate 24 emerging therefrom as circularly polarized light which is reflected off fixed plane mirror 26 and is returned to quarter wave plate 24 with its handedness reversed compared with it handedness prior to reflecting from plane mirror 26. Afterwards, it emerges from quarter wave plate 24 as p-polarized light which is transmitted by beam splitter 16 to travel on to cube corner retroreflector 28. It emerges from retroreflector 28 and travels upwardly again to emerge from beam splitter 16 as a beam of p-polarized light 44. Beam 44 passes through quarter wave plate 24 emerging therefrom as circularly polarized light, reflects from plane mirror 26 having its handedness changed in the process, travels through quarter wave plate 24 emerging therefrom as s-polarized light, and reflects off the diagonal surface of beam splitter 16 where it combines with output beam 42 as output beam 45. Beams 42 and 44 are combined by a polarizing mixer 30 that generates an output beam 46 that is feed to photodetector 32. Photodetector 32 operates to generate and output signal indicative of the optical path difference between the reference and measurement legs of interferometer 10. The output of photodetector 32 is, in turn, feed to a computer 33 for signal processing and analysis in a well-known manner through the use of on-board software designed for that purpose. Alternatively, such processing and analysis may be accomplished via dedicated chips with appropriate functionality such as application specific integrated circuits (ASICs).

In FIG. 4, the measurement leg waveplates 18 and 20 are split so that the double pass transmissions through them to the moveable mirror 22 do not generate two-reflection ghost beams parallel to the main beams. This is most important for the measurement quarter waveplates, but may be useful for the reference waveplate as well as will be seen in FIG. 5. As will be appreciated, the waveplate segments, 18 and 20, must have their birefringent axes oriented correctly, just as is the case for a single conventional waveplate. Such waveplates are commercially available for operation at two or more wavelengths that may also be harmonically related.

In this way, interferometer means have been provided for receiving two orthogonally polarized beams and providing first and second measurement legs, separating the two beams for travel along said first and second measurement legs, respectively, and generating exit beams containing information about the respective differences in the optical paths each beam experienced in traveling the first and second measurement legs. The first and second measurement legs have optical paths structured and arranged such that at least one of them has a variable physical length, the optical path length difference between the first and second measurement legs varying in accordance with the difference between the respective physical lengths of their optical paths and wherein at least one of the first and second measurement legs comprises a pair of oppositely tilted quarter-wave plates for controlling the state of polarization of said beams while reducing the effects of ghost reflections on said exit beams. It will also be evident that this arrangement is a highly stable one since the reference and measurement beams travel through the same optical path lengths in glass components thereby making interferometer 10 less sensitive to thermal effects. Also, as a consequence of the double pass geometry, the effects of tilts in the plane mirrors are canceled.

It will be evident that the orthogonally polarized input beam components may be provided as spatially separated beams for further reducing polarization mixing. This may be accomplished in well-known manners as, for example, through the use of polarizing beam splitters and plane mirrors or shear plates carrying polarizing beam splitter coatings. If spatially separated input beams are used, there will be corresponding output beams that are combined similarly.

Figure 5:
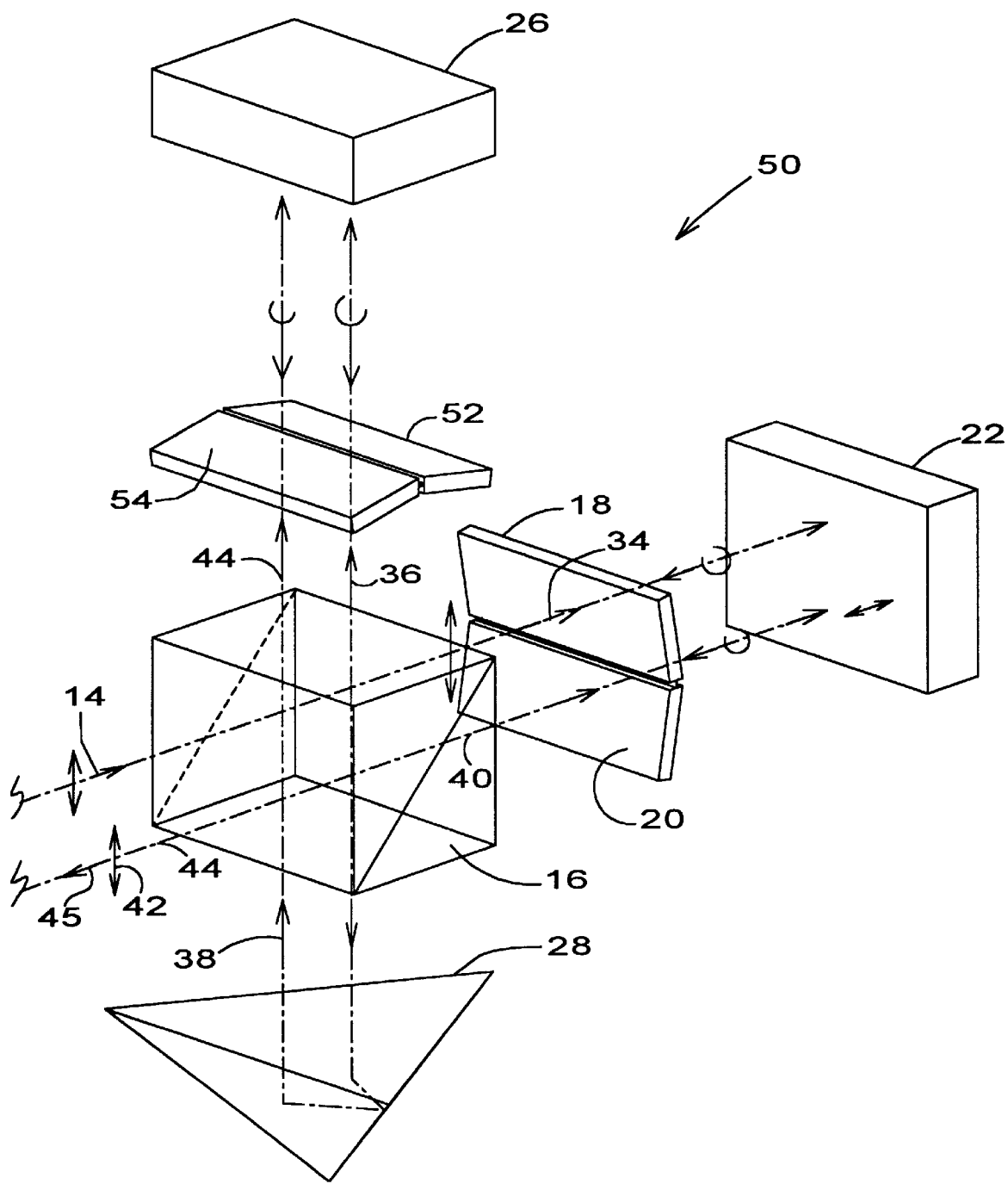
FIG. 5 is a diagrammatic perspective view of a high stability plane mirror interferometer that employs two sets of oppositely tilted quarter wave plates, one set in the measurement leg and one in the reference leg of the interferometer, respectively, to reduce the effects of undesirable ghost reflections on the output signals.

FIG. 5 is a diagrammatic perspective view of a high stability plane mirror interferometer 50 that employs two sets of oppositely tilted quarter wave plates, one set in the measurement leg and one in the reference leg of the interferometer, respectively, to reduce the effects of undesirable ghost reflections on the output signals. Accordingly, interferometer 50 differs from interferometer 10 by the addition of two oppositely tilted quarter wave plates 52 and 54; otherwise, elements common to both interferometer 10 and 50 are identified with the same numeral and operate as described above. However, the beam source 14, polarization mixer 30, photodetector 32, and computer 33 have been omitted to simplify the drawing but, in practice, would be included. Quarter wave plates 52 and 54 operate the same as did quarter wave plates, 18 and 20, in interferometer 10 except now in the reference leg of interferometer 50.

It will be appreciated that the present invention may be utilized in other polarization interferometers having architectures different from those described. For example, the invention can be used in plane mirror interferometers uncompensated for thermal effects, differential plane mirror interferometers, double differential plane mirror interferometers, and dual linear/angular displacement interferometers such as those described in the aforementioned paper of Dr. C. Zanoni which is incorporated herein by reference in its entirety. Also, reference may be had to U.S. Pat. Nos. 4,881,816, 4,859,066, 4,881,815, and 4,883,357 as further examples of dual linear/angular displacement interferometers, and these patents are also incorporated herein by reference.

Other changes will be obvious to those skilled in the relevant field based on the teachings and embodiments of the invention described and these are intended to be within the scope of the invention as claimed.

What is claimed is:

1. Polarization interferometric apparatus, said apparatus comprising interferometer means for receiving at least two beams and providing first and second measurement legs, separating said two beams for travel along said first and second measurement legs, respectively, and generating exit beams containing information about the respective differences in the optical paths each beam experienced in traveling said first and second measurement legs, said first and second measurement legs having optical paths structured and arranged such that at least one of them has a variable physical length, the optical path length difference between said first and second measurement legs varying in accordance with the difference between the respective physical lengths of their optical paths and wherein at least one of said first and second measurement legs comprises a pair of differently tilted retardation elements for reducing the effects of ghost reflections on said exit beams.

2. The polarization interferometric apparatus of claim 1 further including means for combining said exit beams to produce mixed optical signals containing information corresponding to the phase differences between each of said exit beams from corresponding ones of said predetermined optical paths of said first and second measurement legs.

3. The polarization interferometric apparatus of claim 2 further including means for detecting said mixed optical signals and generating electrical interference signals containing information corresponding to difference in physical path lengths of said measurement legs and their relative rate of change.

4. The polarization interferometric apparatus of claim 3 further including electronic means for analyzing said electrical interference signals.

5. The polarization interferometric apparatus of claim 1 wherein said retardation elements comprise a split pair of oppositely tilted quarter wave plates.

6. The polarization interferometric apparatus of claim 5 further including means for generating at least two beams having orthogonal polarization states.

7. The polarization interferometric apparatus of claim 1 wherein said interferometer means comprises at least one polarizing beam splitter for separating orthogonally polarized beams for travel along corresponding ones of said first and second measurement legs.

8. The polarization interferometric apparatus of claim 1 wherein said interferometer means comprises at least one plane mirror in one of said measurement legs.

9. The polarization interferometric apparatus of claim 1 wherein said interferometer means comprises a plurality of optical elements, which include said retardation elements, composed of glass and arranged such that said separated beams traveling along said first and second measurement legs travel through said optical elements composed of glass over substantially equal optical path lengths to compensate for thermal effects.

10. The polarization interferometric apparatus of claim 1 wherein said beams travel along a coextensive path.

11. The polarization interferometric apparatus of claim 9 wherein said plurality of optical elements include a polarizing beam splitter having an entrance facet, an exit facet, a top facet, and a bottom facet, a first fixed plane mirror arranged above and substantially parallel to said top facet, a first quarter-wave plate located intermediate said first plane mirror and said top facet, a second movable plane mirror arranged substantially parallel to and opposite to said exit facet, said pair of differently tilted retardation elements being quarter-wave plates fixedly located intermediate said second plane mirror and said exit facet.

12. The polarization interferometric apparatus of claim 6 wherein said interferometer is arranged so that said orthogonally polarized beams make a double pass therethrough and wherein each pass of said double pass is through a corresponding one of said pair of oppositely tilted retardation elements.

13. The polarization interferometric apparatus of claim 1 wherein at least two of said beams have different wavelengths.

14. The polarization interferometric apparatus of claim 13 wherein said different wavelengths of said beams are harmonically related.

15. An interferometer for measuring displacement of an object, said interferometer comprising means for providing a measurement leg for receiving a measurement beam, said measurement leg being structured so that the measurement beam makes at least two spatially-separated passes to the object, said measurement leg having at least two retardation elements by which the polarization of the measurement beam is controlled, one of each of said at least two retardation elements corresponding to each of the passes of the measurement beam, said retardation elements being arranged with a relative tilt angle between any two of said at least two retardation elements to reduce the effects of ghost beams.

* * * * *